United States Patent
VanBlon et al.

(10) Patent No.: US 10,818,086 B2
(45) Date of Patent: Oct. 27, 2020

(54) AUGMENTED REALITY CONTENT CHARACTERISTIC ADJUSTMENT

(71) Applicant: Lenovo (Singapore) Pte. Ltd., Singapore (SG)

(72) Inventors: Russell Speight VanBlon, Raleigh, NC (US); Robert James Kapinos, Durham, NC (US); Scott Wentao Li, Cary, NC (US); Robert James Norton, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/892,904

(22) Filed: Feb. 9, 2018

(65) Prior Publication Data

US 2019/0251746 A1 Aug. 15, 2019

(51) Int. Cl.
*G06T 19/00* (2011.01)
*G06T 15/50* (2011.01)

(52) U.S. Cl.
CPC .......... *G06T 19/003* (2013.01); *G06T 15/503* (2013.01); *G06T 19/006* (2013.01)

(58) Field of Classification Search
CPC .... G06T 19/003; G06T 15/503; G06T 19/006
See application file for complete search history.

(56) References Cited

U.S. PATENT DOCUMENTS

| | | | |
|---|---|---|---|
| 8,947,322 B1 | 2/2015 | Chi et al. | |
| 9,865,091 B2* | 1/2018 | Giraldi | G06T 19/006 |
| 9,898,844 B2* | 2/2018 | Mullins | G06T 19/006 |
| 10,140,957 B1* | 11/2018 | Letourneur | G06F 40/109 |
| 2002/0044152 A1 | 4/2002 | Abott, III et al. | |
| 2013/0044128 A1 | 2/2013 | Liu et al. | |
| 2013/0336629 A1 | 12/2013 | Mulholland et al. | |
| 2014/0237366 A1 | 8/2014 | Poulos et al. | |
| 2014/0253588 A1* | 9/2014 | Mandala | G02B 27/01 345/633 |
| 2015/0153570 A1* | 6/2015 | Yamamoto | H04M 1/72563 345/184 |
| 2016/0034042 A1* | 2/2016 | Joo | G02B 27/0172 345/633 |
| 2018/0025504 A1 | 1/2018 | Mason | |

* cited by examiner

*Primary Examiner* — Jwalant Amin
(74) *Attorney, Agent, or Firm* — Ference & Associates LLC

(57) ABSTRACT

One embodiment provides a method, including: displaying, using at least one processor, augmented reality content; determining, using a processor, a context associated with a user; and adjusting, based on the context and without additional user input, at least one characteristic of the augmented reality content. Other aspects are described and claimed.

20 Claims, 3 Drawing Sheets

AUGMENTED REALITY CONTENT CHARACTERISTIC ADJUSTMENT

BACKGROUND

Advances in technology have led to the development of information handling devices ("devices"), for example smart phones, tablet devices, headsets, and the like, capable of displaying augmented reality ("AR") content. These AR-enabled devices may provide an overlay of virtual elements onto a live view of a physical, real-world environment. The virtual elements may be spatially registered with the physical world so that the virtual elements may be perceived as an immersive aspect of the physical world.

BRIEF SUMMARY

In summary, one aspect provides a method, comprising: displaying, using a processor, augmented reality content; determining, using a processor, a context associated with a user; and adjusting, based on the context and without additional user input, at least one characteristic of the augmented reality content.

Another aspect provides an information handling device, comprising: a processor; a display; a memory device that stores instructions executable by the processor to: display augmented reality content; determine a context associated with a user; and adjust, based on the context and without additional user input, at least one characteristic of the augmented reality content on the display.

A further aspect provides a product, comprising: a storage device that stores code, the code being executable by a processor and comprising: code that displays augmented reality content; code that determines a context associated with a user; and code that adjusts, based on the context and without additional user input, at least one characteristic of the augmented reality content.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
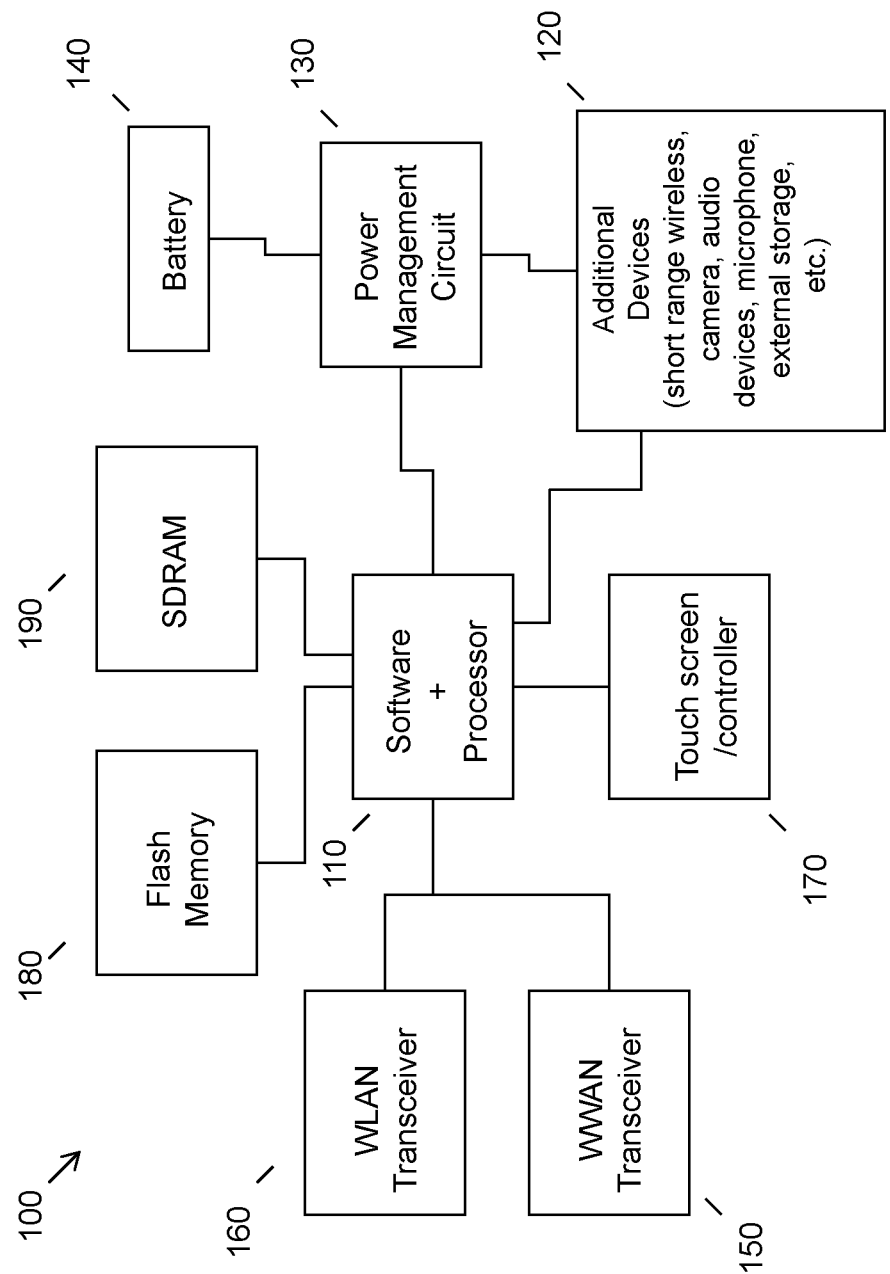
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

AR-enabled devices may be able to display virtually any type of AR content to a user. Using these devices, a user may process and interact with the content in a new and unique way. However, the display of AR content may also present risks of that content being a nuisance or danger to the user. This issue is especially exacerbated if a user is wearing an AR headset (e.g., Google Glass®, Microsoft Hololens®, etc.). More particularly, when wearing an AR headset, the AR content is generally projected into a field of view of a user. Depending on the characteristics of the AR content (e.g., size, shape, color, position, etc.), the AR content may interfere with a user's ability to properly perceive and function in the real world. For example, if a large application window is displayed in front of a user's face, their vision of their surroundings may be compromised. Additionally, even if the AR content is located at a peripheral edge of a user's field of view, the content may still be distracting to the user, especially if the content is animated.

Conventionally, users may manually adjust one or more characteristics of the displayed AR content. However, although a user has some level of control over how the AR content is displayed, they may not be able to make adjustments in a timely fashion, especially if their situational context changes rapidly. For example, if a user has large virtual objects displayed in their field of view and a situation arises where they need to move quickly away from their current location, the user may waste time trying to adjust the characteristics of the displayed content so that their vision of the physical world is unencumbered. As such, the provision of additional input is both time-consuming and burdensome.

Accordingly, an embodiment provides a method for automatically adjusting at least one characteristic of displayed AR content based upon a determined context associated with a user. In an embodiment, AR content may be displayed on a display of an AR-enabled device. An embodiment may then determine a context associated with a user (e.g., a user's location, a user's speed, other individuals in proximity to the user, etc.) and thereafter adjust at least one characteristic of the AR content (e.g., size, position, opacity, etc.) based on the context. Such a method may automatically control how AR content is displayed so that a user may visualize the content in a context appropriate way.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
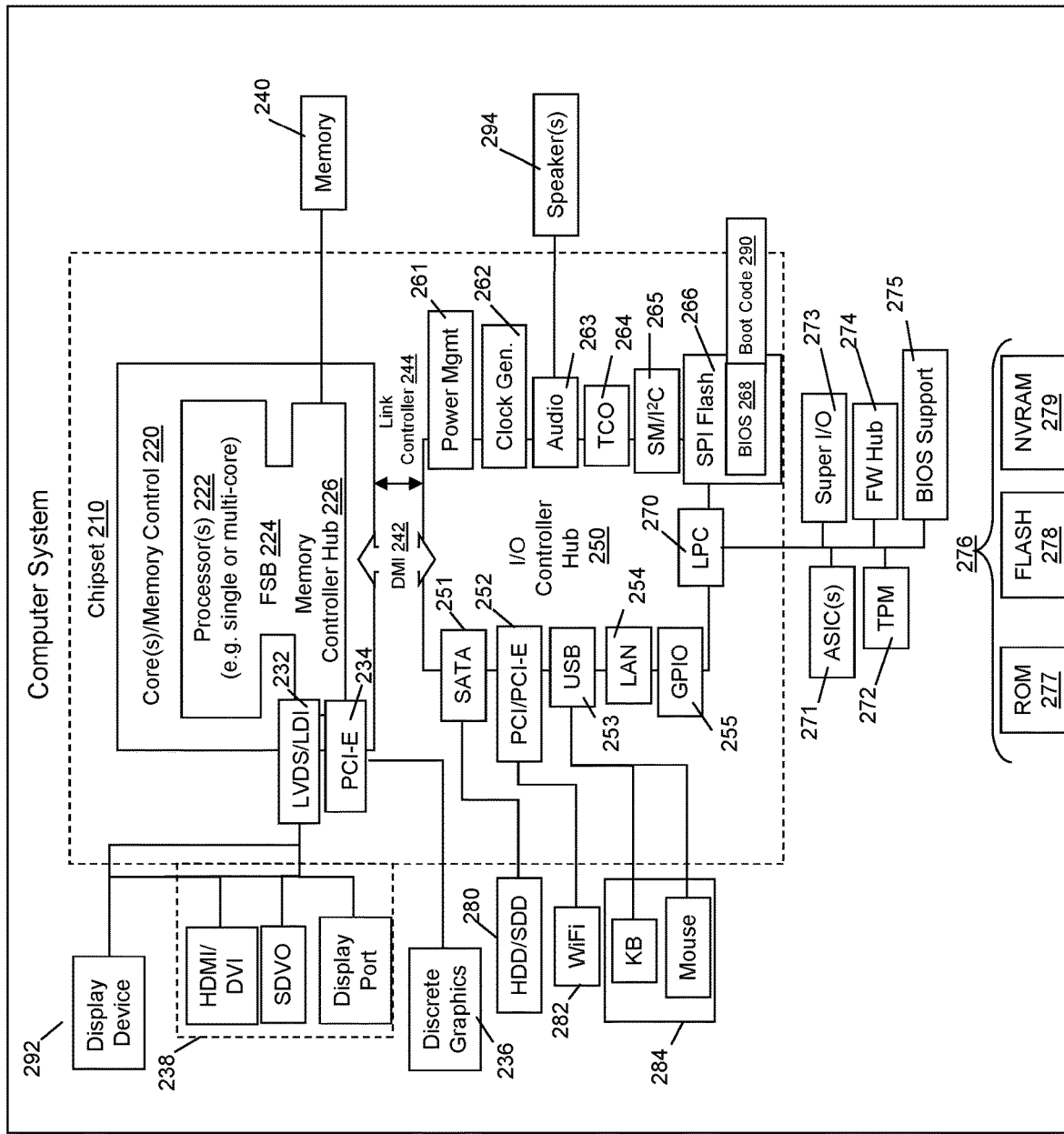
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, wearable headsets, personal computer devices generally, and/or electronic devices that are capable of displaying augmented reality content and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
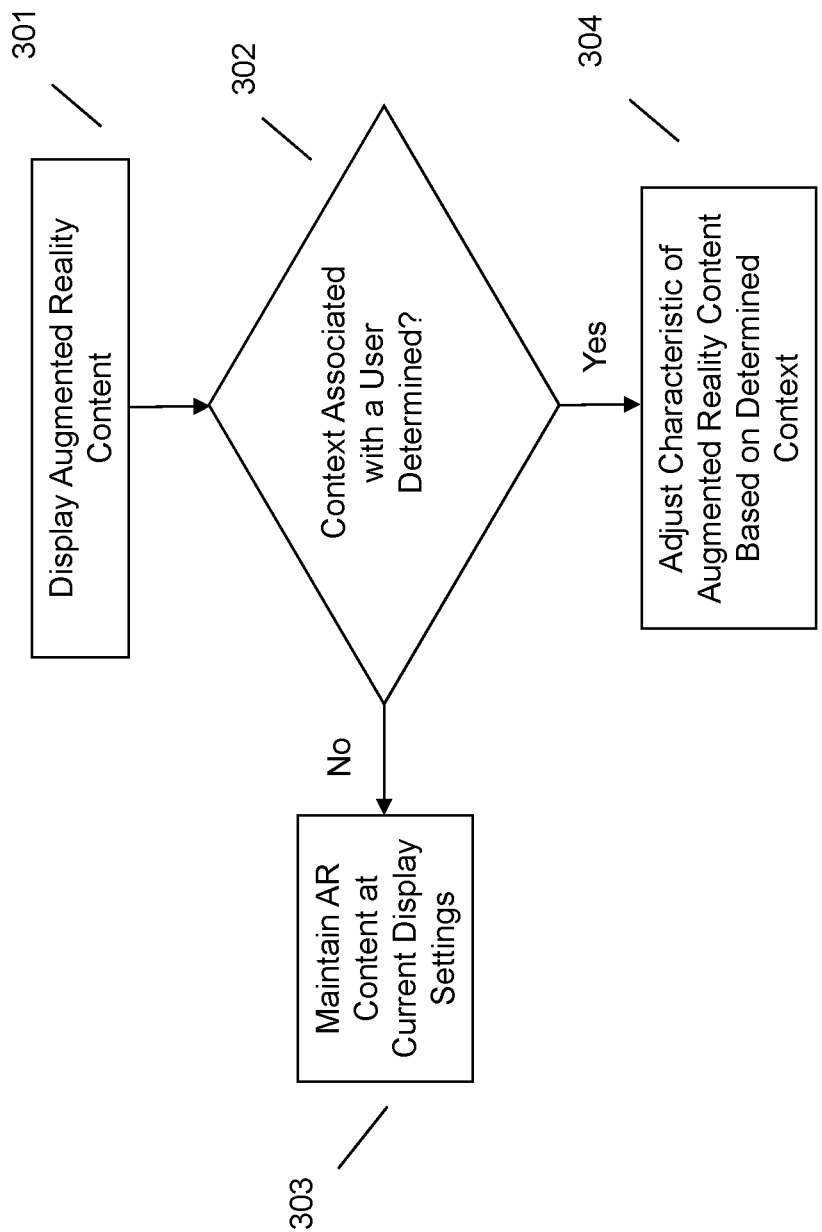
FIG. 3 illustrates an example method of adjusting at least one characteristic of displayed augmented reality content.

Referring now to FIG. 3, an embodiment may automatically adjust at least one characteristic of displayed augmented reality content based upon a determined context associated with a user. At 301, augmented reality content may be displayed on a display of an AR-capable device. In the context of this application, the AR content may be virtually any type of AR content capable of being displayed on an AR device (e.g., application windows, static or dynamic images, etc.). In the context of this application, an AR-capable device may be any device capable of displaying AR content (e.g., smart phone, tablet, wearable headset, etc.). For simplicity purposes, the majority of the discussion herein will involve AR content displayed on an AR headset. However, it should be understood that generally any AR-capable device may be utilized to display AR content.

In an embodiment, one or more sensors may be operatively coupled to the AR headset (e.g., an image sensor such as a camera, an audio capture device such as a microphone, etc.). The one or more sensors may collect data associated with a user and their surroundings and thereafter use that data in determining a context associated with the user. In an embodiment, the AR headset may receive additional context-related data from other devices. For example, an AR headset may be in communication with a user's smart watch and use data obtained from the user's smart watch to determine a context associated with a user (e.g., receive accelerometer data from the smartwatch to determine a user's speed, etc.).

Responsive to determining, at 302, that there are no contextual parameters associated with a user, an embodiment may continue to display, at 303, the AR content at the current display settings. However, responsive to determining, at 302, a context associated with a user, an embodiment may adjust, at 304, at least one characteristic of the AR content.

In an embodiment, the context may be virtually any detectable context associated with a user (e.g., a user's location, a user's current speed, other individuals proximate to the user, a combination thereof, etc.). In an embodiment, the at least one characteristic associated with the AR content may be virtually any adjustable characteristic of the displayed AR content (e.g., size, position, opacity, a combination thereof, etc.). In an embodiment, the adjustment of the AR content may be done automatically and without user input. More particularly, a user does need to provide an explicit user command (e.g., voice input, touch input, gesture input, etc.) to the system in order for a characteristic of the AR content to be adjusted.

Described below are example embodiments corresponding to characteristic adjustment of displayed AR content. It should be understood that these examples are non-limiting and that the novel concepts in this application may be applicable to other situations and contexts not explicitly described herein.

In an embodiment, the context may be associated with a user's current geographic location. An embodiment may be able to determine a user's current geographic location using one or more location determination techniques (e.g., GPS tracking, location triangulation, other location determination techniques, etc.). Responsive to determining a user's location, an embodiment may automatically adjust at least one characteristic of displayed AR content. For example, responsive to determining that a user is at work, an embodiment may increase the opacity of displayed AR content and/or decrease the size of the displayed AR content.

In an embodiment, the geographic location may correspond to a positional determination of the user's particular location in a building or vehicle. For example, responsive to determining that a user is in their office, an embodiment may display AR content in the center of a user's field of view, display AR content in a larger format, display AR content in a less transparent manner, and the like. If an embodiment determines that a user has left their office and walked into a meeting room, then an embodiment may decrease the size of the AR content, re-position the AR content to a periphery of a user's field of view, increase the opacity of the AR content, and the like. In a similar example, an embodiment may determine whether the user is a driver or passenger in a vehicle. Responsive to determining that the user's position corresponds to a driving or vehicle operating position, an embodiment may minimize or clear all AR content from the display. However, if an embodiment determines that a user is a passenger in the vehicle, then an embodiment may display the AR content at a user's preferred or existing viewing settings. The user's position in a building or vehicle may be determined using one or more conventional positional determination techniques that may involve the receipt and processing of data from other sensors and/or devices.

In an embodiment, the context may be associated with a user's speed. An embodiment may be able to determine a user's speed using one or more speed determination techniques (e.g., using GPS data, accelerometer data, other speed determination techniques, etc.). In an embodiment, responsive to determining that the user's speed is greater than a predetermined threshold (e.g., that may be set by a manufacturer and/or may be set and adjusted by a user, etc.), an embodiment may adjust at least one characteristic of displayed AR content. For example, an embodiment may increase the opacity of displayed AR content responsive to determining that a user has started walking after having previously consumed the AR content in a stationary position.

In an embodiment, there may be multiple predetermined thresholds, where each of the predetermined thresholds corresponds to a different speed. In an embodiment, each of the speeds may have a particular adjustment setting associated with it. For example, responsive to determining that the walking user in the previous paragraph has started running, an embodiment may move the AR content to a peripheral edge of the user's vision so that their central field of view is clear. In another example, responsive to determining that a user has started moving at speeds commonly associated with moving vehicles, an embodiment may automatically minimize or clear the AR content from the display. An embodiment may utilize the aforementioned position determination techniques to ensure that AR content is not automatically cleared when a user is a passenger in a moving vehicle.

In an embodiment, the context may be associated with the identity of other individuals proximate to the user. In an embodiment, the identity of the other individuals may be determined using one or more identification techniques. For example, an embodiment may receive user identification data from a device associated with a proximate individual (e.g., an individual's laptop, an individual's smart phone, an individual's smart watch or fitness tracker, etc.). As another example, an embodiment may capture an image of one or more proximate individuals and compare that captured image to an accessible database containing at least one stored image of an identified individual. In yet another example, an embodiment may detect (e.g., using one or more microphones, etc.) voice data associated with another individual (e.g., when another individual is speaking, etc.). An embodiment may thereafter determine the identity of the other individual by comparing the detected voice print against an accessible database containing at least one stored voice print of an identified individual.

Responsive to determining the identity of a proximate individual, an embodiment may adjust at least one characteristic of displayed AR content. For example, responsive to determining that a user's boss is nearby, an embodiment may decrease the size of displayed AR content, increase the opacity of the AR content, reposition the AR content so a user's central field of view is clear, a combination thereof, and the like. In an embodiment, an embodiment may adjust a characteristic of the AR content responsive to simply identifying that another individual is proximate to the user, regardless of the other individual's identity.

In an embodiment, the AR content may be automatically adjusted to a context appropriate setting responsive to receiving a first indication to display AR content. For example, upon initiation of the AR headset or responsive to a user command to display AR content, an embodiment may determine a user's context and thereafter display the initial AR content (i.e., the first AR content displayed upon initiation of the AR headset or in response to a user command) at the characteristics associated with that context.

In an embodiment, the way AR content is adjusted may follow a predetermined ruleset that may be stored in an accessible storage database (e.g., cloud storage, remote storage, local storage, network storage, etc.). The predetermined ruleset may govern the adjustments made to the AR content responsive to a particular contextual determination. In an embodiment, the predetermined ruleset may be originally set by a manufacturer and later adjusted by a user.

The various embodiments described herein thus represent a technical improvement to conventional AR content adjustment techniques. Using the techniques described herein, an embodiment may display AR content on an AR-capable device. An embodiment may determine a context associated with a user (e.g., a user's location, a user's speed, identity of other users in proximity to the user, etc.) and thereafter adjust, based on the determined context, at least one characteristic of the AR content (e.g., position of the AR content, opacity of the AR content, size of the AR content, etc.). Such techniques may automatically display, without additional user input, AR content at context-appropriate settings.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
 displaying, using a processor, augmented reality content on an augmented reality device comprising a display and at least one operatively coupled sensor, wherein the at least one operatively coupled sensor comprises at least one sensor located on a device other the augmented reality device, wherein the displaying comprises displaying the augmented reality content at a first display setting;
 determining, using a processor, a context associated with a user, wherein the context is determined based upon an environment of the user, wherein the determining the context comprises determining the environment of the user responsive to receiving an indication to display the augmented reality content, wherein the indication comprises a change in the environment of the user, wherein the environment is identified based on information provided with the indication by the at least one operatively coupled sensor, wherein the information comprises at least one detectable context feature regarding the environment surrounding the user and an attribute of the user; and
 adjusting, responsive to determining the context and based on the context identified from the indication and without additional user input, at least one characteristic of the augmented reality content on the display to a second display setting, wherein the adjusting comprises adjusting the at least one characteristic after the augmented reality content is displayed, wherein the adjusting comprises adjusting the at least one characteristic to adjust a field of view of the user with respect to the environment, wherein the second display setting is based upon the change in the environment of the user identified from the indication.

2. The method of claim 1, wherein the context is associated with a user's location.

3. The method of claim 1, wherein the context is associated with a user's speed.

4. The method of claim 1, wherein the context is associated with at least one other individual proximate to the user.

5. The method of claim 1, wherein determining the context comprises accessing data obtained from another device.

6. The method of claim 1, wherein the determining the context comprises accessing data obtained from at least one sensor.

7. The method of claim 1, wherein the at least one characteristic corresponds to a positional characteristic.

8. The method of claim 1, wherein the at least one characteristic corresponds to an opacity characteristic.

9. The method of claim 1, wherein the at least one characteristic corresponds to a size characteristic.

10. The method of claim 1, wherein the at least one operatively coupled sensor is an image capturing device.

11. An information handling device, comprising:
a processor;
a display;
at least one operatively coupled sensor, wherein the at least one operatively coupled sensor comprises at least one sensor located on a device other the augmented reality device;
a memory device that stores instructions executable by the processor to:
display augmented reality content on an augmented reality device comprising the display and the at least one operatively coupled sensor, wherein to display comprises to display the augmented reality content at a first display setting;
determine a context associated with a user, wherein the context is determined based upon an environment of the user, wherein to determine the context comprises to determine the environment of the user responsive to receiving an indication to display the augmented reality content, wherein the indication comprises a change in the environment of the user, wherein the environment is identified based on information with the indication provided by the at least one operatively coupled sensor, wherein the information comprises at least one detectable context feature regarding the environment surrounding the user and an attribute of the user; and
adjust, responsive to determining the context and based on the context identified from the indication and without additional user input, at least one characteristic of the augmented reality content on the display to a second display setting, wherein to adjust comprises adjusting the at least one characteristic after the augmented reality content is displayed, wherein the adjusting comprises adjusting the at least one characteristic to adjust a field of view of the user with respect to the environment, wherein the second display setting is based upon the change in the environment of the user identified from the indication.

12. The information handling device of claim 11, wherein the context is associated with a user's location.

13. The information handling device of claim 11, wherein the context is associated with a user's speed.

14. The information handling device of claim 11, wherein the instructions executable by the processor to determine comprise instructions executable by the processor to access data obtained from another device.

15. The information handling device of claim 11, wherein the instructions executable by the processor to determine comprise instructions executable by the processor to access data obtained from at least one sensor.

16. The information handling device of claim 11, wherein the at least one characteristic corresponds to a positional characteristic.

17. The information handling device of claim 11, wherein the at least one characteristic corresponds to an opacity characteristic.

18. The information handling device of claim 11, wherein the at least one characteristic corresponds to a size characteristic.

19. The information handling device of claim 11, wherein the at least one operatively coupled sensor is an image capturing device.

20. A product, comprising:
a storage device that stores code, the code being executable by a processor and comprising:
code that displays augmented reality content on an augmented reality device comprising a display and at least one operatively coupled sensor, wherein the at least one operatively coupled sensor comprises at least one sensor located on a device other the augmented reality device, wherein the code that displays comprises code that displays the augmented reality content at a first display setting;
code that determines a context associated with a user, wherein the context is determined based upon an environment of the user, wherein the code that determines the context comprises code that determines the environment of the user responsive to receiving an indication to display the augmented reality content, wherein the indication comprises a change in the environment of the user, wherein the environment is identified based on information with the indication provided by the at least one operatively coupled sensor, wherein the information comprises at least one detectable context feature regarding the environment surrounding the user and an attribute of the user; and
code that adjusts, responsive to determining the context and based on the context identified from the indication and without additional user input, at least one characteristic of the augmented reality content on the display to a second display setting, wherein to adjust comprises adjusting the at least one characteristic after the augmented reality content is displayed, wherein the code that adjusts comprises code that adjusts the at least one characteristic to adjust a field of view of the user with respect to the environment, wherein the second display setting is based upon the change in the environment of the user identified from the indication.

* * * * *